United States Patent [19]
Gupta et al.

[11] Patent Number: 5,710,913
[45] Date of Patent: Jan. 20, 1998

[54] METHOD AND APPARATUS FOR EXECUTING NESTED LOOPS IN A DIGITAL SIGNAL PROCESSOR

[75] Inventors: Kumkum Gupta, Orinda; Mihran Touriguian, Hercules; Ingrid Verbauwhede, Berkeley; Harlan W. Neff, Castro Valley, all of Calif.

[73] Assignee: Atmel Corporation, San Jose, Calif.

[21] Appl. No.: 581,167

[22] Filed: Dec. 29, 1995

[51] Int. Cl.$^6$ ........................................... G06F 9/32
[52] U.S. Cl. .............................. 395/588; 395/568
[58] Field of Search ........................ 395/800, 561, 395/588, 568, 573, 595

[56] References Cited

U.S. PATENT DOCUMENTS

| | | | |
|---|---|---|---|
| 4,652,997 | 3/1987 | Kloker | 395/588 |
| 4,858,115 | 8/1989 | Rusterholz et al. | 395/800 |
| 4,862,407 | 8/1989 | Fette et al. | 395/800 |
| 5,375,238 | 12/1994 | Ooi | 395/588 |
| 5,481,723 | 1/1996 | Harris et al. | 395/706 |

*Primary Examiner*—Parshotam S. Lall
*Assistant Examiner*—Viet Vu
*Attorney, Agent, or Firm*—Thomas Schneck; George B. F. Yee

[57] ABSTRACT

A digital signal processing system for executing instructions, including a program memory which stores the instructions and a program control unit for receiving and processing a sequence of the instructions to generate control signals for controlling operation of the system, and a loop circuit for use in such a program control unit. The loop circuit controls execution of a loop (preferably a nested loop) of a sequence of the instructions. Preferably, the loop circuit includes loop registers for storing loop start and end addresses and loop count values, and logic circuitry for implementing loops (including nested loops) in response to the addresses and count values in the loop registers. The loop circuit is initialized by loading appropriate addresses and values into the loop registers. After initialization, the loop circuit executes true zero overhead nested loops of instructions in the sense that the instructions to be looped need not include any initialization instructions, any special instruction to indicate the start of a loop or any dedicated branch instruction at the end of a loop for branching back to the start. Preferably, the loop circuit includes an end address comparator and circuitry for disabling this comparator when the loop circuit is not executing a loop to reduce circuit power consumption. Other aspects of the invention are methods of operating such a digital signal processor, and such a loop circuit.

9 Claims, 3 Drawing Sheets

METHOD AND APPARATUS FOR EXECUTING NESTED LOOPS IN A DIGITAL SIGNAL PROCESSOR

FIELD OF THE INVENTION

The present invention relates to a digital signal processor which includes circuitry for two loops for controlling execution of a group of instructions a pre-specified number of times, and to nested looping methods performed during operation of such a digital signal processor with zero instruction overhead inside these group of instructions to be looped.

BACKGROUND OF THE INVENTION

Many different digital signal processor (DSP) implementations are well known in the art. A conventional DSP typically includes at least one multiply and accumulate (MAC) unit since, since for many signal processing applications the operations of multiplication and addition (accumulation) are frequently used, and an appropriately designed MAC unit (implemented as hardwired circuitry) can perform such operations efficiently.

A conventional DSP typically also employs two physically separate memory units: a program memory for storing instructions to be executed by the DSP; and a data memory for storing data to be processed (and optionally also data that has been processed) by the DSP as a result of executing the instructions. The program memory can be a read-only memory (ROM) or a random access memory (RAM) to which data can be written and from which data can be read. The data memory is typically a RAM to which data can be written and from which data can be read.

Figure 1:
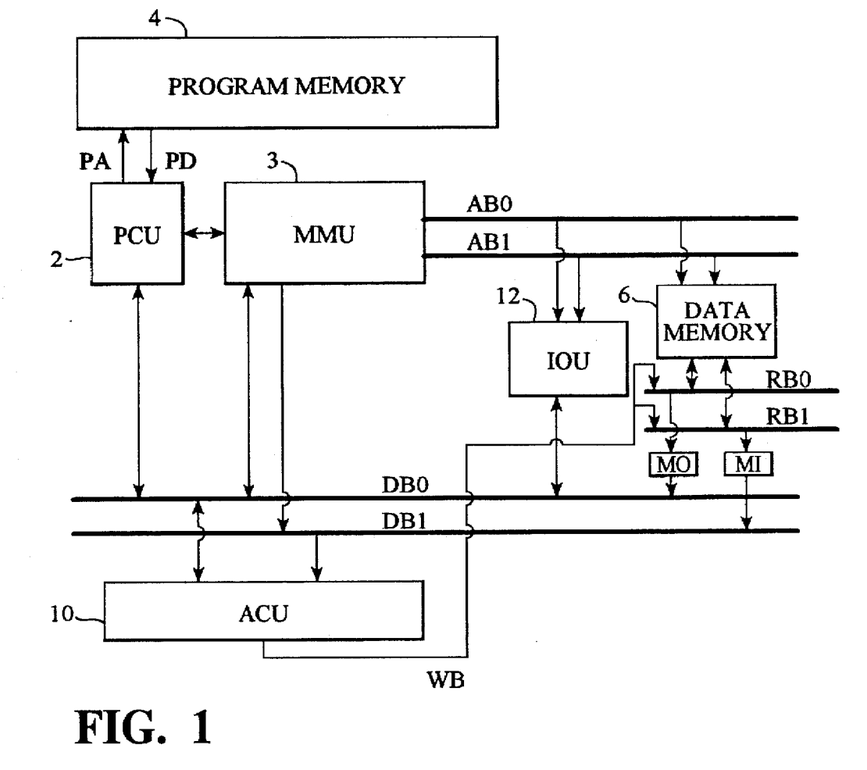
FIG. 1 is a schematic block level diagram of a digital signal processing system (DSP) which includes a program memory and a data memory.

FIG. 1 is a block level diagram of a digital signal processor (DSP), of the type having a program control unit which can be designed to implement the present invention. The DSP of FIG. 1 includes data memory 6 (connected to address buses AB0 and AB1 and to data buses DB0 and DB1), program memory 4, program control unit (PCU) 2, memory management unit (MMU) 3, arithmetic computational unit (ACU) 10, and input/output unit (IOU) 12.

In implementations preferred for some applications (such as that to be described with reference to FIG. 2), program memory 4 is a single port, read-only memory (ROM) with an array of storage locations 32 bits wide and 64K words deep, and data memory 6 is a dual port, random-access memory (RAM) with an array of storage locations 16 bits wide and 64K words deep. In such implementations, one port of dual port memory 6 can receive a 16-bit address (from 16-bit address bus AB0) and at the same time, the other port of memory 6 can receive another 16-bit address (from 16-bit address bus AB1). Control means are provided so that two simultaneous reads from memory 6, a simultaneous read from and write to memory 6, or a single read from (or write to) memory 6 can be performed.

MMU 3 preferably includes two independent address generation units for generating two address signals (each identifying a memory location in memory 6 for writing data to or reading data from) and asserting such address signals to address buses AB0 and AB1. More specifically, in response to control bits from PCU 2 (which have been generated in PCU 2 by decoding instructions from program memory 4), MMU 3 drives address signals on address bus AB0 and/or address bus AB1. Data is read from the memory location (in memory 6) identified by each address into pipeline register M0 or pipeline register M1 (or data is written from data bus DB0 and/or data bus DB1 into the memory location identified by each address).

Preferably MMU 3 includes a set of eight address pointer registers (each for storing a 16-bit address which can be asserted to bus AB0 or AB1), an 8-bit pointer modifier register for each address pointer register, and a 16-bit adder for adding the contents of any selected address pointer register with the contents of a corresponding pointer modifier register, and writing the result of this addition back into the address pointer register (in response to control bits from PCU 2). Preferably, MMU 3 also includes other registers for use in modifying the contents of selected ones of the address pointer registers and pointer modifier registers in response to control bits from PCU 2.

In the DSP of FIG. 1, each of first data bus DB0 and second data bus DB1 is preferably 16 bits wide. In variations on the FIG. 1 system, a DSP programmed to implement the invention can have a single port data memory (rather than a dual port data memory), and single address bus and a single data bus (rather than dual address buses and dual data buses).

PCU 2 (a preferred implementation of which will be described below with reference to FIG. 3) includes instruction fetch means (for fetching instructions from program memory 4), an instruction decode unit, and registers for storing control bits generated in the decode unit (for assertion to MMU 3, data bus DB0, or the instruction fetch means).

Arithmetic computational unit (ACU) 10 preferably includes two Multiply and Accumulate (MAC) units which operate in parallel (in response to control bits from PCU 2), and an arithmetic manipulation unit which operates in parallel with the MAC units (in response to control bits from PCU 2).

IOU 12 includes means for monitoring the addresses on address buses AB0 and AB1 to determine the type of memory access being implemented. IOU 12 sets a flag to PCU 2 if the addresses are outside a predetermined address range (e.g., addresses for an external memory, other than memory 6, accessible through a port connected along bus AB0 and/or AB1). PCU 2 can assert wait states for slower memory accesses in response to such flags.

The present invention is desirably implemented in a DSP for use in communications operations. For example, it is contemplated that in a preferred embodiment, PCU 2 of the DSP of FIG. 1 is designed to implement the invention, and this DSP (identified as processor 100 in FIG. 2) is then included in a mobile digital telephone system of the type shown in FIG. 2. In the FIG. 2 system, serial port SIO of processor 100 (DSP 100) receives digitized speech from audio codec unit 106, and DSP 100 sends digital audio data (via port SIO) to codec unit 106 for conversion to analog form and then transmission to a loudspeaker. DSP 100 is also connected through analog front end circuit 104 to an RF transceiver 108. Circuit 104 includes means for digitizing a received signal from transceiver 108 (for baseband processing by means within DSP 100), and for converting digital data from DSP 100 into a continuous analog signal for transmission by transceiver 108. In typical implementations, circuit 104 would interrupt DSP 100 to indicate a request for or a presence of data (and circuit 104 is mapped into a memory address of DSP 100 so that circuit 104 can efficiently communicate over one of the data buses within DSP 100). Microcontroller 102 supplies control signals to all other elements of the FIG. 2 system and controls the communication protocol between the FIG. 2 system (which is typically a mobile station) and a remote base station. Typically, microcontroller 102 would be connected to a parallel port (PIO) of DSP 100.

It is desirable to design a DSP to be capable of executing instructions in nested loops. However, it had not been known until the present invention how to provide a DSP with hardware for executing such nested loops, without the need for the DSP to generate or execute any special instruction to indicate the start of a loop, or any dedicated branch instruction at the end of a loop for branching back to the start. The present invention achieves this objective, thus provides a method and apparatus for implementing "true zero overhead" nested loops in a DSP.

SUMMARY OF THE INVENTION

A preferred embodiment of the invention is a digital signal processing system for executing instructions, including a program memory which stores the instructions, and a program control unit connected to the program memory for receiving and processing a sequence of the instructions to generate control signals for controlling operation of the system in response to the instructions. The program control unit includes circuitry for controlling execution of nested loops of a sequence of the instructions. In other embodiments, the invention is a loop circuit for use in such a program control unit.

In preferred embodiments, the program control unit includes a program count register from which instruction addresses are asserted to the program memory, an instruction register for receiving instructions read from the program memory in response to the addresses, a decode circuit for receiving and decoding instructions from the instruction register, and a loop circuit. The loop circuit includes two sets of loop registers, each set for storing loop start and end addresses and loop count values from the decode circuit (or an external processor) for one loop, and logic circuitry for implementing true "zero overhead" nested loops of instructions in response to the addresses and count values in both sets of loop registers. The loop circuit is also operable in a mode in which it executes a simple (non-nested) loop using addresses and values stored in one set of loop registers. The loop circuit is initialized by loading appropriate addresses and other values into the loop registers. After initialization, the loop circuit executes true "zero overhead" nested loops of instructions in the sense that the instructions to be looped need not include any special instruction to indicate the start of a loop and need not include any dedicated branch instruction at the end of a loop for branching back to the start.

In a preferred embodiment, when implementing a nested loop, the loop circuit automatically loads a loop current count register with the contents of the corresponding loop repeat count register every time the loop count reaches zero and the address in the program count register (PC) matches the end address for that loop. Thus, no special instruction (e.g., no special loop current count register reload instruction) is required in the outer loop.

Preferably, the program control unit includes means for interrupting execution of the looped code. Preferably also, the loop circuit includes a pair of end address comparators (a first comparator for an inner loop, and a second comparator for an outer loop) and a comparator control means for asserting enabling/disabling bits to the comparators. Both comparators are disabled at the end of execution of a nested loop (to reduce circuit power consumption) in response to an instruction which causes the comparator control means to assert disabling bits to the comparators.

Other aspects of the invention are methods of operating a digital signal processor of the described types, and methods of operating a loop circuit of the described types. One embodiment is a method of operating a digital signal processor having a program memory which stores instructions and program control unit connected to the program memory for receiving a sequence of the instructions and generating control signals in response to the instructions, including the steps of:

(a) initializing a first set of loop registers by storing therein loop start and end addresses and loop count values for an inner loop;

(b) initializing a second set of loop registers by storing therein loop start and end addresses and loop count values for an outer loop; and (c) after steps (a) and (b), executing a nested loop of instructions using the addresses and count values in the loop registers, in response to a loop start signal.

Preferably, a loop current count register for the inner loop is loaded with a value preloaded in a loop repeat count register for the inner loop in response to a first signal indicating a final repetition of the inner loop and a second signal indicating that the program control unit has been set to assert a last instruction of the inner loop. Thus, no special inner loop current count register reload instruction need be included in the outer loop of instructions.

In another embodiment, the method includes the steps of enabling a pair of end address comparators (a first comparator for an inner loop, and a second comparator for an outer loop) during execution of a nested loop, and asserting disabling bits to the comparators following execution of the nested loop (to reduce circuit power consumption).

DETAILED DESCRIPTION OF THE PREFERRED EMBODIMENT

Figure 2:
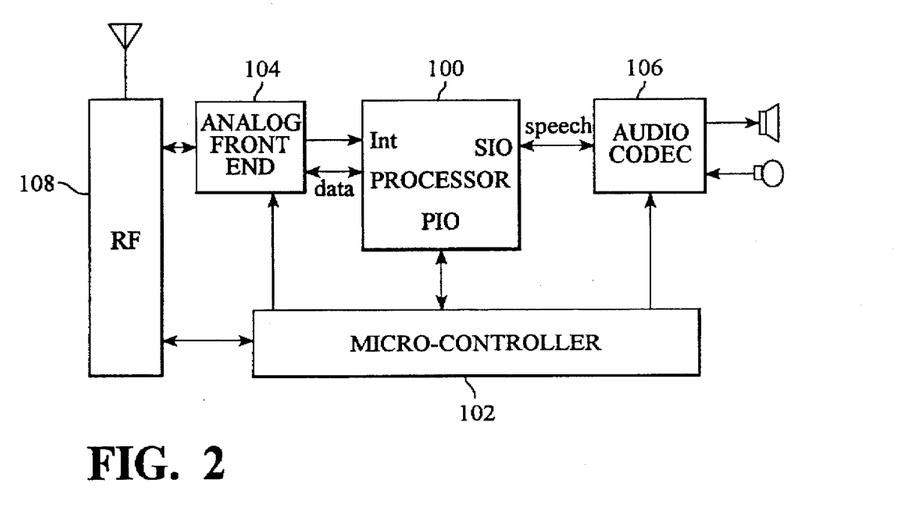
FIG. 2 is a schematic block level diagram of a mobile digital telephone system which includes the DSP of FIG. 1.

In a preferred embodiment, the present invention is implemented in a digital signal processor (DSP) of the type described herein with reference to FIGS. 1, 3, 4, and 5 (which can be included in a system of the type shown in FIG. 2). Additional aspects of such DSP are described in U.S. Patent Applications entitled "Digital Signal Processing Method and System Employing Separate Program and Data Memories to Store Data" by Mihran Touriguian, G. Fettweis, and I. Verbauwhede (Attorney Docket No. TEKN-5900), "Digital Signal Processing Method and System Implementing Pipelined Read and Write Operations" by I. Verbauwhede and G. Fettweis (Atty Docket No. TEKN-6100), and "Circuit for Rotating, Left Shifting, or Right Shifting Bits" by J. Muwafi, G. Fettweis, and H. Neff (Attorney Docket No. TEKN-6300), all filed on the same day as the present application and assigned to the assignee of the present application, the disclosures of which are incorporated herein in full by reference.

Figure 3:
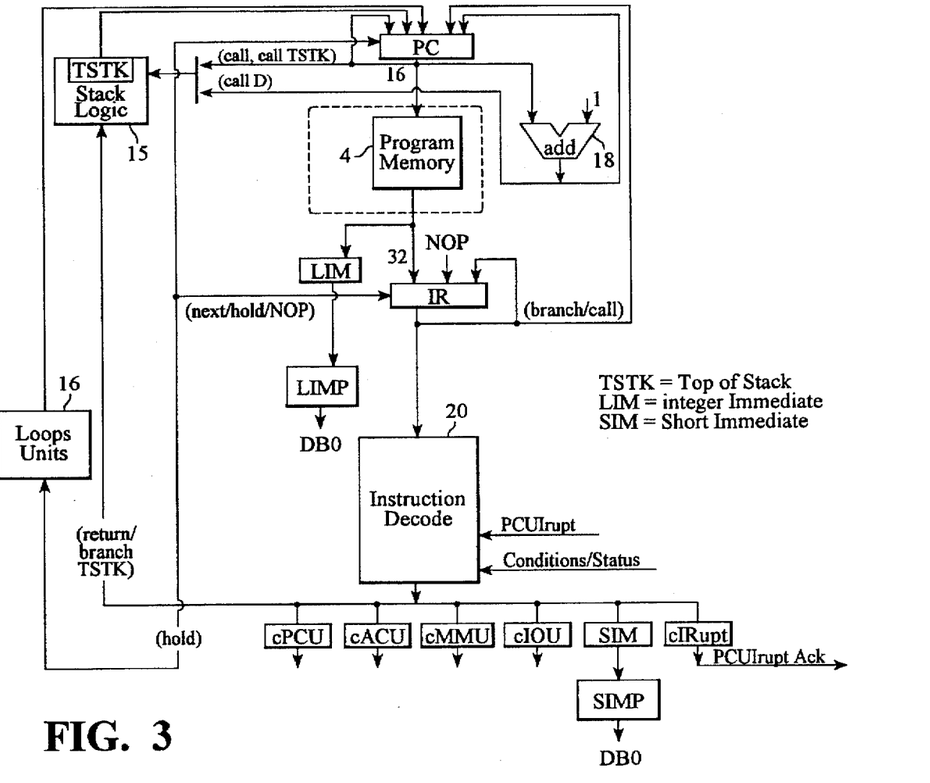
FIG. 3 is a schematic block level diagram of a preferred implementation of the program control unit of the DSP of FIG. 1 (which is programmed to implement the invention).

FIG. 3 is a diagram of a preferred implementation of program control unit (PCU) 2 of the DSP, which includes means for implementing the invention. PCU 2 of FIG. 3 receives (at instruction register IR) a sequence of 32-bit instructions from program memory 4, generates control signals for controlling execution of the instructions, and stores the control signals in selected ones of registers cPCU, cACU, cMMU, cIOU, and cIRupt.

Each 32-bit word stored in program memory 4 can be either an instruction, or a data value to be processed in accordance with one or more instructions.

As shown in FIG. 3, PCU 2 includes program counter register PC for storing a sequence of 16-bit instruction addresses (for use in addressing program memory 4), and instruction register IR for receiving a 32-bit word (either a data value or an instruction) read from program memory 4 in response to each instruction address asserted from register PC to memory 4. In executing a program comprising a sequence of instructions, PCU 2 loads a sequence of 16-bit instruction addresses into register PC for addressing program memory 4, and instruction register IR (and/or below-discussed register LIM) receives a sequence of 32-bit words (each of which is either a data value or an instruction) from program memory 4 (memory 4 asserts one 32-bit word to register IR or register LIM in response to each 16-bit instruction address asserted from register PC to memory 4).

PCU 2 also includes instruction decode unit 20 which includes logic circuitry for receiving and processing 32-bit words from instruction register IR. In response to a distinctive instruction (denoted herein as a "program memory data" instruction) received from register IR, unit 20 treats bits from program memory 4 as data values (rather than as instructions) in the sense that unit 20 causes these bits to be written directly to a register (such as LIM or SIM), and then to another register (such as LIMP or SIMP), and then to data bus DB0 (e.g. for processing in ACU 10). In response to each word in register IR other than a data value designated by a program memory data instruction, unit 20 decodes such word to generate therefrom a set of control bits for controlling operation of the system (e.g., control bits which are asserted from unit 20 to register cMMU, and then from register cMMU to MMU 3 for use in controlling a read of data from data memory 6).

PCU 2 of FIG. 3 also includes stack logic 15 (including "top of stack" register TSTK), adder 18, and loop unit 16. By including the embodiment of loop unit 16 described below with reference to FIG. 5, PCU 2 of FIG. 3 implements a preferred embodiment of the invention.

Each time register PC asserts an instruction address to program memory 4 (during each "fetch" cycle of the pipelined operation to be described below), adder 18 increments this instruction address (by adding "1" thereto). The incremented address asserted at the output of adder 18 can be asserted directly to register PC or to stack logic 15. In one operating mode, the incremented address is asserted from adder 18 to register PC. In another operating mode, the register PC is updated with the contents of register TSTK (rather than with the output of adder 18).

Stack logic 15 implements a sixteen level deep hardware last-in-first-out (LIFO) stack for execution of program calls and returns for subroutine branching. A stack pointer selects which one of the sixteen registers is accessed. A read from register TSTK (to register PC) pops the stack, and a write to register TSTK pushes a return address into the stack. At appropriate times during execution of a sequence of instructions from memory 4, the incremented address from adder 18 is written to top of stack register TSTK (so that the incremented address is the next address loaded to program counter register PC).

When implementing the five stage instruction pipeline described below with reference to FIG. 4, it takes two cycles to execute a program branch as follows. During a fetch cycle, a branch instruction is fetched from memory 4 and saved in register IR. Then, in the decode cycle, unit 20 decodes the instruction in register IR and the branch address is placed in register PC to cause the program to branch to the new address. If the instruction is a call instruction, in the same cycle, the return address is pushed into a location in the stack pointed to by an incremented value of the stack pointer. Then, when a return from a subroutine occurs, the contents of this location are loaded (i.e., the return address) into register PC and the stack pointer is decremented.

Loop unit 16 includes logic circuitry for executing a group of instructions a pre-specified number of times, in response to control bits generated by unit 20 (which can be stored in register cPCU and then asserted from register cPCU to unit 16). Preferably, initialization of unit 16 is performed independently from operation of unit 16 (to execute looped instructions) so that initialization need not immediately precede the instructions to be looped. Also preferably, unit 16 is designed so it requires neither a special "start of loop" instruction at the beginning of the group of instructions to be looped nor a special "dedicated branch" instruction at the end of such group of instructions. A preferred embodiment of loop unit 16 is described below with reference to FIG. 5.

Figure 4:
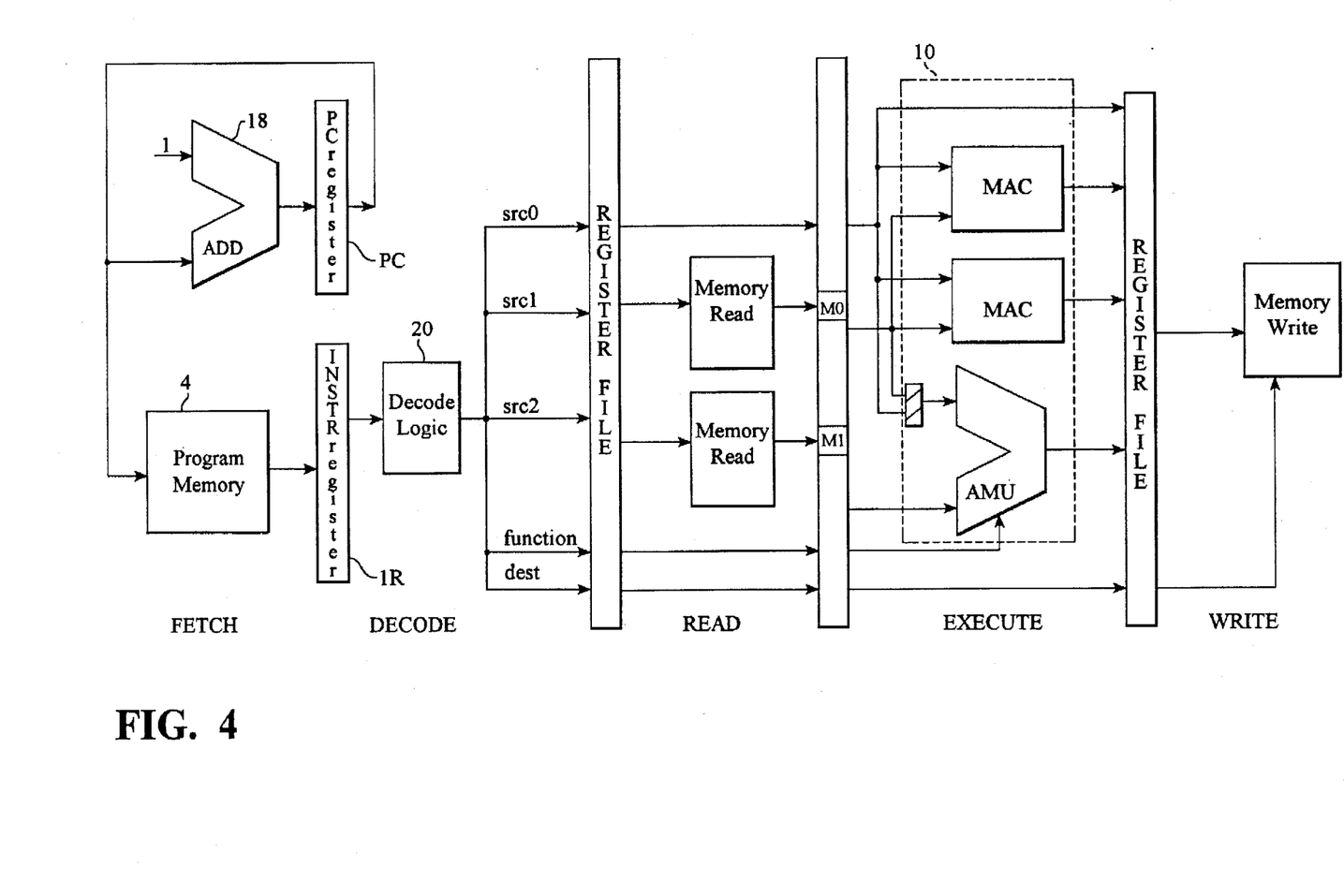
FIG. 4 is a diagram of the pipelined manner in which the DSP of FIGS. 1 and 3 preferably executes a sequence of instructions from program memory 4.

FIG. 4 is a diagram of a five stage instruction pipeline in accordance with which the DSP of FIGS. 1 and 3 (including PCU 2 shown in and described with reference to FIG. 3) preferably executes a sequence of instructions from program memory 4. This pipeline is a "five stage" pipeline in the sense that five clock cycles (referred to as "fetch," "decode," "read," "execute," and "write" cycles) are required to execute one instruction. However, a new instruction can be received from program memory 4 every clock cycle, so that the effective number of clock cycles per instruction (averaged over many clock cycles) is one. The pipeline is implemented with a "register-memory" architecture, in the sense that an access of the data memory (memory 6) is part of an instruction. This is different from a "load-store" architecture, where a memory is accessed only with a move operation (e.g., specific "load" and "store" instructions).

During the first (Fetch) cycle of the pipeline, a word (which is typically an instruction) is fetched from program memory 4. The following description of the pipeline (with reference to FIG. 4) assumes that the word is an instruction, and the other case (in which the word is a data value) will be discussed following the description of FIG. 4. Also during the Fetch cycle, the instruction fetched from memory 4 is put into instruction register IR, and program counter register PC is updated with a new instruction address (which can be an incremented address asserted at the output of adder 18).

Then, during the Decode cycle of the pipeline, instruction decoding unit 20 receives and decodes the instruction in register IR, thereby generating control signals (control bits) for controlling execution of the instructions. Unit 20 stores the control signals in selected ones of instruction control registers cPCU, cACU, cMMU, cIOU, and cIRupt as follows: control bits for ACU 10 are stored in register cACU, control bits for memory management unit 3 (such as control bits src0, src1, and src2) are stored in register cMMU, control bits for PCU 2 are stored in register cPCU, control bits for IOU 12 are stored in register cIOU, and control bits for an interrupt controller (which is optionally included within IOU 12) are stored in register CIRupt. The control bits stored in the control registers (cPCU, cACU, cMMU, cIOU, and CIRupt) are transferred over lines not shown in FIG. 3 or FIG. 1 to their destinations (the control bits are not transferred over DB0 or DB1). Also, MMU 3 receives any control bits src0, src1, and/or src2 that are generated by unit 20, and MMU 3 decodes these control bits to generate address signals, so that MMU 3 can assert these address signals on address bus AB0 and/or address bus AB1 at the start of the next ("Read") cycle of the pipeline.

Then, during the Read cycle of the pipeline, data is read from one or two locations within data memory 6. The data read from one such location is written to register M0 (shown in FIG. 1), and the data read from the other location is written to register M1 (also shown in FIG. 1). Any post-modification of address signals to be performed by MMU3 is also performed during the Read cycle. Any data values (in contrast with instructions) fetched from program memory 4 during the preceding "Fetch" are also pipelined (transferred to their appropriate destinations, such as to ACU 10 over bus DB0) during the Read cycle.

Then, during the "Execute" cycle, computations are performed (typically by ACU 10) on the data values residing in the source registers of the units for performing such computations. For example, ACU 10 receives and processes data values from appropriate registers (e.g., register LIMP or SIMP within PCU 2, or registers M0 or M1, or registers within ACU 10). The resulting processed data values are placed in appropriate registers (e.g., in accumulator registers within ACU 10).

Then, during the final ("Write") cycle, processed data values are written back to data memory 6. Optionally also, some post-processing such as post-shifting, is performed on the processed data values before they are written into memory 6.

Figure 5:
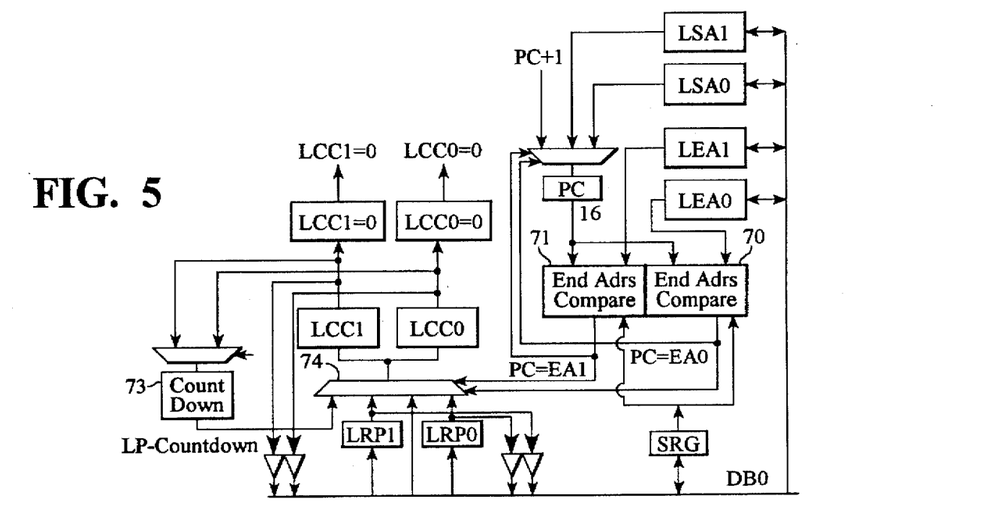
FIG. 5 is a schematic block level diagram of an implementation of loop unit 16 of the program control unit of FIG. 3 (which is designed to implement a preferred embodiment of the invention).

In the embodiment of loop unit 16 shown in FIG. 5, the loop unit includes circuitry for implementing a non-nested loop (either "loop0" or "loop1"), or a nested loop in which either "loop0" or "loop1" is the inner loop. The loop unit of FIG. 5 includes the following registers (each preferably having 16-bit capacity) for storing addresses and values during initialization of loop0: register LSA0 for storing a loop start address (the address in memory 4 of the first instruction in a sequence of instructions to be looped), register LEA0 for storing a loop end address (the address in memory 4 of the last instruction in the sequence of instructions to be looped), register LRP0 for storing a loop repeat value (indicative of the number of repetitions of loop0), and register LCC0 for storing the current loop count value (indicative of the remaining number of repetitions of loop0 to be performed).

Loop unit 16 also includes the following registers (each preferably having 16-bit capacity) for storing addresses and values during initialization of loop1: register LSA1 for storing a loop start address (the address in memory 4 of the first instruction in a sequence of instructions to be looped), register LEA1 for storing a loop end address (the address in memory 4 of the last instruction in the sequence of instructions to be looped), register LRP1 for storing a loop repeat value (indicative of the number of repetitions of loop1), and register LCC1 for storing the current loop count value (indicative of the remaining number of repetitions of loop1 to be performed).

Loop unit 16 also includes a 16-bit comparator 70 for comparing the address in register PC with the loop end address in register LEA0, a 16-bit comparator 71 for comparing the address in register PC with the loop end address in register LEA1, a subtraction unit 73 (for decrementing by one the value in register LCC0 in response to a signal from circuit 70 indicating that the address in register PC matches the end address in register LEA0, or decrementing by one the value in register LCC1 in response to a signal from circuit 71 indicating that the address in register PC matches the end address in register LEA1), and signal selection circuit 74. Selection circuit 74 selectively loads the contents of register LRP0, data from bus DB0 or the output of circuit 73 to register LCC0, and selectively loads the contents of register LRP1, data from bus DB0 or the output of circuit 73 to register LCC1.

The preferred loop circuit of FIG. 5 can implement a loop length of the size of program memory 4, and the number of iterations for each level (each inner loop or each outer loop) can be from 1 to 65,536. Both the circuitry for implementing loop0 and that for implementing loop1 have identical behavior. Either the circuitry for loop0 or that for loop1 can be used to implement a single level loop. To implement a nested loop using the FIG. 5 circuit, either loop0 or loop1 can be the inner loop, and the other one of loop0 and loop1 is the outer loop (the end address for the outer loop must always be greater than the end address for the inner loop).

To allow automatic reloading, a count value stored in loop repeat count register LRP0 (LRP1) is used to reload register LCC0 (LCC1) at the end of a loop. A write to register LRP0 or LRP1 (e.g., from decode unit 20 of FIG. 3) also preloads the corresponding loop current count register (LCC0 or LCC1). However, a write to LCC0 (LCC1) writes only to that loop current count register. LRP0 and LCC0 (and LRP1 and LCC1) are independently readable registers.

Mode bits LPEN0 and LPEN1 are loaded into status register SRG for use in enable/disable of loop0 and loop1. Register SRG is connected along bus DB0 and can be loaded by means (such as decode unit 20) within PCU 2 (register SRG preferably has context saving on interrupts). When LPEN0 is set to a first value (e.g., "1") and asserted from register SRG to comparator 70, it enables circuit 70 so that the latter performs end address comparison for loop0, for repetitively executing the specified code. When LPEN1 is set to a first value (e.g., "1") and asserted from register SRG to comparator 71, it enables circuit 71 so that the latter performs end address comparison for loop1, for repetitively executing the specified code. When LPEN0 (LPEN1) is set to a second value (e.g., "0"), end address comparator 70 (71) is disabled to conserve power. A reset instruction causes PCU 2 to disable (set to "0") both loop enable bits LPEN0 and LPEN1. Loading of loop repeat count register LRP0 (LRP1) enables loop operation for loop0 (loop1) by setting to "1" the corresponding loop enable bit. To achieve power saving, an appropriate instruction should be asserted to register IR to set LPEN0 and LPEN1 to values which disable the comparators (e.g., by generating such values in decode circuit 20 and sending these values to register SRG), after completion of execution of the two hardware loops (loop0 and loop1).

The FIG. 5 circuit allows for initialization and execution of looped code independently of each other. The initialization of the loop registers is done in advance and does not have to immediately precede the code to be looped. Due to the nature of the pipeline (described with reference to FIG. 4), the loop registers are loaded during the Execute cycle. Hence there should be a minimum of three instructions asserted to register IR between initialization of the loop registers and the end of a loop. If this rule is violated, the results of operation of the FIG. 5 circuit will be unpredictable. At the completion of a loop, the corresponding loop current count register LCC0 (or LCC1) is automatically reloaded to its initial value in the corresponding loop repeat count register LRP0 (LRP1).

Each of loop0 and loop1 is fully interruptible. If an interrupt service routine (ISR) uses loop0 or loop1, instructions should be provided in such routine to save all control registers and counters for the loop used at the start of ISR and restore them at the end.

A programmer should be aware of the special behavior of registers LRP0, LRP1, LCC0, LCC1 in the preferred implementation of FIG. 5. A write to the loop repeat count register (LRP0 or LRP1) also loads the corresponding loop current count register LCC0 (or LCC1) with the same value, and sets bit LPEN0 (or LPEN1). The loop count register is readable. The loop current count registers (LCC0 and LCC1) can also be independently read and written to.

We next describe operation of the loop circuit of the invention.

In response to instructions loaded into register IR, appropriate ones of the loop registers (LRP0, LRP1, LCC0, LCC1, LSA0, LSA1, LEA0, LEA1) are preloaded before the loop is started. The loop registers are loaded during the Execute stage of the pipeline. In response to an instruction to preload register LRP0 (LRP1), PCU 2 also loads the corresponding loop current count register (with the same value) and sets the mode bit (LPEN0 or LPEN1) for that loop.

Once the loop mode bit LPEN0 or LPEN1 is enabled (set to a first value, e.g. "1"), the address in register PC is always compared against the "end address" in register LEA0 or LEA1. After the loop registers have been preloaded, execution of a loop (either loop0 or loop1) is initiated upon encountering the first instruction of the loop from program memory 4 (which is followed by assertion, from program memory 4 to PCU 2, of the first instruction in the sequence to be repeated). When the comparator (70 or 71) determines that the end address of a loop (an inner or outer loop) is reached, and if the loop count (in the corresponding one of registers LCC0 and LCC1) is not zero, the current count register is counted down (a decremented count is loaded into the appropriate one of registers LCC0 and LCC1), the start address is loaded (from the corresponding one of registers LSA0 and LSA1) into register PC, and the program goes to the start of the loop and goes through another iteration of the loop. However, if the loop count is zero when the address in register PC matches the end address, the loop current count register (LCC0 or LCC1) is reloaded with the value in the corresponding loop repeat count register (LRP0 or LRP1) and the program exits that loop.

In case of a nested loop, the loop current count register for the inner loop (LCC0 if loop0 is the inner loop, or LCC1 if loop1 is the inner loop) is reloaded with the contents of the loop repeat count register for the inner loop (LRP0 if loop0 is the inner loop, or LRP1 if loop1 is the inner loop) every time the loop count for the inner loop reaches zero and the address in register PC is equal to the end address for the inner loop. So, no inner loop current count register reload instruction is required in the outer loop. When the outer loop count reaches zero and the address in register PC is equal to the end address for the outer loop, the program exits the nested loops and the loop current count register for the outer loop is reloaded with the contents of the repeat count register for the outer loop.

If there are only two levels of nested loops, an instruction should be asserted (e.g., to register IR) to set LPEN0 and LPEN1 to values which cause disabling of the comparators (70 and 71) after completion of both these loops. In the case of more than two levels of nested loops (i.e. two inner loops implemented by the FIG. 5 hardware, and other loops implemented as software loops), reloading of the current count registers requires no overhead as the hardware takes care of it, and bits LPEN0 and LPEN1 should be set to "comparator disabling" values after completion of all the loops (the instruction for so setting LPEN0 and LPEN1 is asserted outside the outermost loop).

When executing a loop, the FIG. 5 circuit preferably takes following action at the following stage of the pipeline described with reference to FIG. 4: the loop current count (the contents of register LCC0 or LCC1) is decremented in circuit 73 at the end of the Fetch stage of the last instruction in the loop.

If the first instruction of a loop is an instruction comprising two words (which are sequentially written to register IR), the loop start address (loaded into register LSA0 or LSA1) should be the address of the first of these two words. If the last instruction of a loop is an instruction comprising two words (which are sequentially written to register IR or written to IR & LIM, respectively), the loop end address (loaded into register LEA0 or LEA1) should be the address of the last of these two words.

Preferably, when register LRP0 (or LRP1) is loaded, the same value is automatically loaded into register LCC0 (LCC1), and the loop enable bit LPEN0 (or LPEN1) is also automatically set to a first value (e.g., "1"). At completion of a loop (for example, an inner loop of a nested loop), the corresponding loop current count register (LCC0 or LCC1) is automatically reloaded to its initial value (by loading the contents of the corresponding loop repeat count register, LRP0 or LRP1, into it).

At times when the FIG. 5 circuit is not executing loop0, loop enable bit LPEN0 is preferably set to a second value (e.g., "0") to disable comparator 70 and thus reduce power consumption of the FIG. 5 circuit. Similarly, at times when the FIG. 5 circuit is not executing loop1, loop enable bit LPEN1 is preferably set to a second value (e.g., "0") to disable comparator 71 and thus reduce power consumption of the FIG. 5 circuit.

In operating an embodiment of PCU 2 that includes the FIG. 5 implementation of loop unit 16, the following rules apply. The end address of an outer loop (in a nested loop) should be greater than the end address of the inner loop (the inner and outer loops should not have the same address). If the loop control registers are loaded (and bit LPEN0 or LPEN1 are set) during the Execute cycle of the described five-cycle pipeline, at least three instructions should be loaded into register IR between preloading of the loop registers and the start of the loop. Register LRP0 (LRP1) and register LCC0 (LCC1) should be programmed with a value which is one less than the number of times the loop is to be executed. Register LCC0 (LCC1) should be loaded only after register LSA0 (LSA1) and register LEA0 (LEA1) have been loaded.

Preferably, an embodiment of PCU 2 that includes the FIG. 5 implementation of loop unit 16 is capable of interrupting execution of looped code. When an interrupt controller sends an interrupt flag to PCU 2 (at a time when the instruction being decoded in decode unit 20 is interruptible), PCU 2 preferably acknowledges the interrupt by asserting an acknowledge signal to register CIRupt and from register CIRupt to the interrupt controller. Then, PCU 2 performs status and context savings, and then the interrupt controller loads a branch interrupt instruction to register PC (for assertion to program memory 4).

The methods implemented by the described apparatus are within the scope of the invention. In a preferred embodiment, the zero overhead loop method of the invention includes the steps of:

(a) initializing loop registers (e.g., registers LRP0, LCC0, LSA0, and LEA0, or registers LRP1, LCC1, LSA1, and LEA1) by storing loop start and end addresses and loop count values therein; and (b) after step (a), executing a true, zero overhead loop (preferably a nested loop) of instructions using the addresses and count values in the loop registers, in response to a loop enable signal (e.g., loop enable bit LPEN0 or LPEN1).

Preferred embodiments of the method and system of the invention have been described with reference to FIGS. 1 and 3–5. Although these embodiments have been described in some detail, it is contemplated that many changes from (and variations on) these embodiments can be made without departing from the spirit and scope of the invention as defined by the appended claims.

What is claimed is:

1. A digital signal processing system, for executing instructions and thereby processing data, said system including:

a program memory which stores the instructions; and program control means for receiving a sequence of the instructions from the program memory and generating control signals for controlling execution of the instructions in said sequence, wherein the program control means includes a loop circuit for causing the program control means to execute a nested loop of the instructions, wherein the nested loop includes an inner loop and an outer loop, and wherein the loop circuit includes:

a first set of loop registers for storing first loop start and end addresses and loop count values for the inner loop;

a second set of loop registers for storing therein second loop start and end addresses and loop count values for the outer loop;

logic circuitry for controlling execution of the nested loop using the addresses and loop count values in the loop registers, in response to a loop enable signal;

a first end address comparator for comparing addresses corresponding to instructions of the inner loop against the first loop end address; and a second end address comparator for comparing addresses corresponding to instructions of the outer loop against the second loop end address.

2. The system of claim 1, wherein the first set of loop registers includes a first current count register and a first loop repeat count register, and wherein the logic circuitry includes:

means for loading the first current count register with a value preloaded in the first loop repeat count register, in response to a first signal indicating a final repetition of the inner loop and a second signal indicating that the program control means has been set to assert a last instruction of the inner loop.

3. The system of claim 2, wherein the second set of loop registers includes a second current count register and a second loop repeat count register, and wherein the logic circuitry includes:

means for loading the second current count register with a value preloaded in the second loop repeat count register, in response to a signal indicating a final repetition of the outer loop and a signal indicating that the program control means has been set to assert a last instruction of the outer loop.

4. The system of claim 1, wherein the logic circuitry also includes:

means for asserting disabling bits to the first end address comparator and the second end address comparator following execution of the nested loop.

5. A loop circuit for controlling execution of a nested loop by a digital signal processing system, where the digital signal processing system includes a program control means for receiving a sequence of instructions from a program memory and generating control signals for controlling execution of the instructions in said sequence, wherein the nested loop includes an inner loop of a sequence of the instructions and an outer loop of another sequence of the instructions, said loop circuit including:

a first set of loop registers for storing loop start and end addresses and loop count values for the inner loop;

a second set of loop registers for storing therein loop start and end addresses and loop count values for the outer loop;

logic circuitry for controlling execution of the nested loop using the addresses and loop count values in the loop registers, in response to a loop enable signal;

a first end address comparator for comparing addresses corresponding to instructions of the inner loop against the first loop end address; and a second end address comparator for comparing addresses corresponding to instructions of the outer loop against the second loop end address.

6. The loop circuit of claim 5, wherein the first set of loop registers includes a first current count register and a first loop repeat count register, and wherein the logic circuitry includes:

means for loading the first current count register with a value preloaded in the first loop repeat count register, in response to a first signal indicating a final repetition of the inner loop and a second signal indicating that the program control means has been set to assert a last instruction of the inner loop.

7. The loop circuit of claim 6, wherein the second set of loop registers includes a second current count register and a second loop repeat count register, and wherein the logic circuitry includes:

means for loading the second current count register with a value preloaded in the second loop repeat count register, in response to a signal indicating a final repetition of the outer loop and a signal indicating that the program control means has been set to assert a last instruction of the outer loop.

8. The loop circuit of claim 5, wherein the logic circuitry also includes:

means for asserting disabling bits to the first end address comparator and the second end address comparator following execution of the nested loop.

9. A loop circuit for controlling execution of a nested loop by a digital signal processing system, where the digital signal processing system includes a program control means, having an associated program count register, said program control means for receiving a sequence of instructions from a program memory and generating control signals for controlling execution of the instructions in said sequence, wherein the nested loop includes an inner loop of a sequence of the instructions and an outer loop of another sequence of the instructions, said loop circuit including:

- a first set of loop registers for the inner loop comprising a first loop current count register for storing therein a first loop current count value, a first loop repeat count register for storing therein a first loop repeat count value, a first loop start register for storing therein a first loop start value, and a first loop end register for storing therein a first loop end address value;

- a second set of loop registers for the outer loop comprising a second loop current count register for storing therein a second loop current count value, a second loop repeat count register for storing therein a second loop repeat count value, a second loop start register for storing therein a second loop start value, and a second loop end register for storing therein a second loop end address value;

- means for automatically reloading the first loop current count register with the value stored in the first loop repeat count register, in the event the value in the first loop current count register equals zero and the address value in the program count register is equal to the value stored in the first loop end register; and

- means for automatically reloading the second loop current count register with the value stored in the second loop repeat count register, in the event the value in the second loop current count register equals zero and to halt the loop operation in the event the address value in the program count register is equal to the value stored in the second loop end register.

\* \* \* \* \*